Mar. 13, 1923.
J. F. O'CONNOR.
FRICTION SHOCK ABSORBING MECHANISM.
FILED MAY 16, 1921.
1,448,499.
2 SHEETS—SHEET 1.
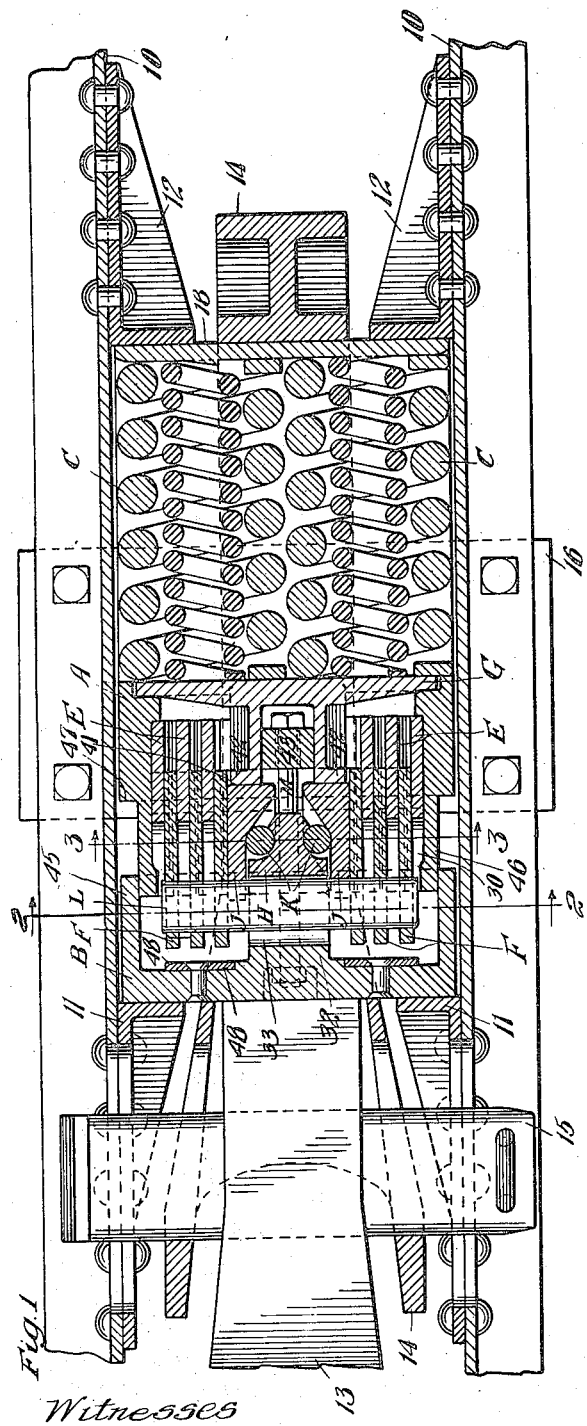
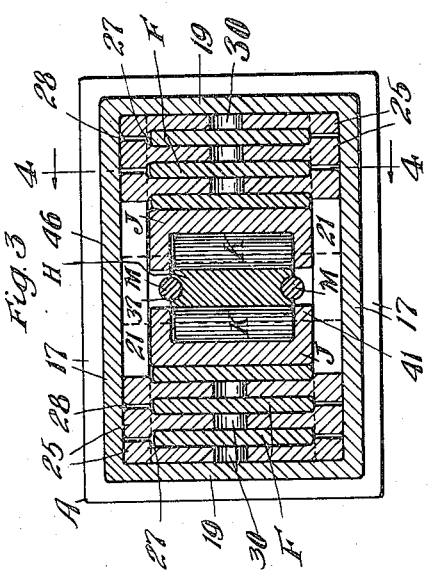
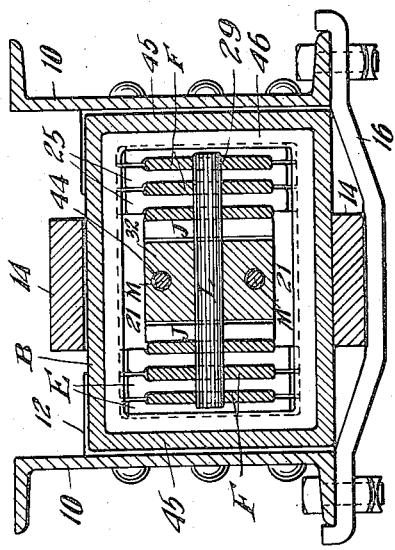
Witnesses
Wm. Geiger
Inventor
John F. O'Connor
By Geo. I. Haight
His Atty.

Mar. 13, 1923.
J. F. O'CONNOR.
FRICTION SHOCK ABSORBING MECHANISM.
FILED MAY 16, 1921.
1,448,499.
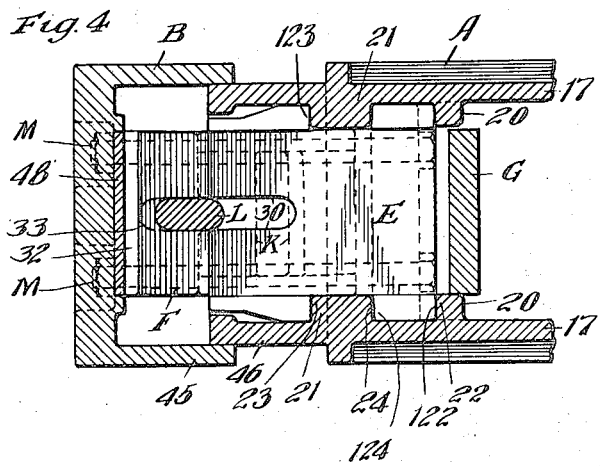
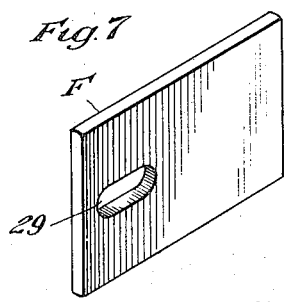
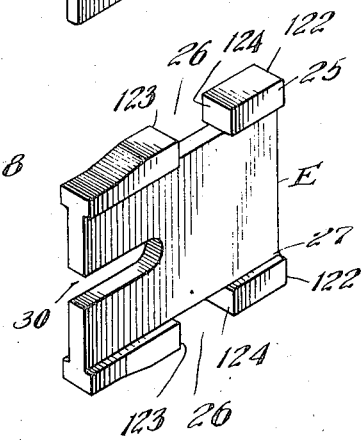
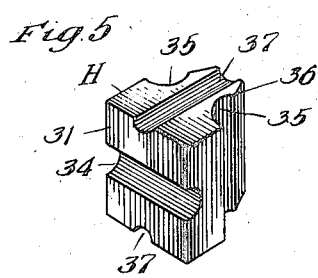
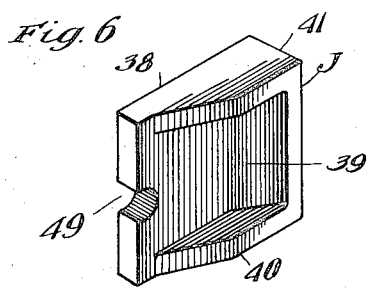
Inventor
John F. O'Connor
By Geo. I. Haight
His Atty.
Witnesses
Wm. Geiger Patented Mar. 13, 1923.

1,448,499

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed May 16, 1921. Serial No. 469,937.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of this invention is to provide a high capacity friction shock absorbing mechanism especially adapted for railway draft riggings and wherein are obtained certain release, a smooth graduated action, a relatively low pressure per unit of area on the cooperating friction elements, and a low ultimate or peak load in the transmission of the forces to the car underframe or other structure to which the shock absorbing mechanism is applied.

Another object of the invention is to provide a mechanism of the character indicated in the preceding paragraph so arranged that the stroke of the mechanism conforms to the full stroke required by standard practice in railway draft riggings, wherein the mechanism is unusually compact and at the same time ample space left for the necessary springs.

Another object of the invention is to provide a mechanism of the character indicated wherein are employed intercalated friction plates, certain of which are relatively stationary and others relatively movable, the arrangement of plates being unusually compact with regard to the normal over-all length required in mounting said plates.

Other objects of the invention are to provide, in a mechanism of the character indicated, movable friction elements arranged to be pushed at one end during the compression stroke and to be pulled outwardly from the same end, the pulling means telescoping within the stationary friction elements during the compression movement whereby the required over-all length of the two sets of movable and stationary friction elements is reduced to a minimum; and an arrangement wherein the movable friction elements may be made of lesser length than heretofore in intercalated types of friction mechanisms and, in fact, not longer than the stationary friction elements.

In the drawings forming a part of this specification, Figure 1 is a horizontal, longitudinal, sectional view of a portion of a railway draft rigging showing my improvements in connection therewith. Figures 2 and 3 are vertical, transverse, sectional views corresponding to the section lines 2—2 and 3—3 respectively of Figure 1, Figure 3 being upon a larger scale than Figure 2 and the car underframe parts being omitted. Figure 4 is a broken, longitudinal, sectional view corresponding to the section line 4—4 of Figure 3. And Figures 5, 6, 7, and 8 are detail perspectives of a wedge, a wedge-shoe, a movable friction plate, and a stationary friction plate, respectively.

In said drawings, 10—10 denote channel draft sills of a railway car, to the inner faces of which are secured front stop lugs 11 and rear stop lugs 12. The inner portion of a drawbar is indicated at 13, the same being operatively associated with the shock absorbing mechanism proper by a hooded cast yoke 14 and coupler key 15. The yoke and parts therein are supported in operative position by a detachable saddle plate 16.

The improved shock absorbing mechanism proper, as shown, comprises, broadly, a column-load-sustaining member, follower or shell A; a front main follower B; twin arranged springs C—C; a series of relatively stationary friction elements E—E; a series of relatively movable friction elements F—F; a spring follower G; a wedge H; a pair of wedge-friction-shoes J—J; a pair of anti-friction rollers K—K; a cross bar of key L; and retainer bolts M—M.

The member A is preferably in the form of a malleable casting and is formed with upper and lower horizontally extending walls 17—17; an integral vertical rear wall 18 functioning as a follower; and vertical side walls 19—19 at the front end thereof, the length of the side walls being comparatively short so as to leave the greater portion of the sides of the casing A open to admit of the insertion and removal of the spring follower G and twin springs C—C. It will be noted that the walls 17 and 19 of the member A, at the forward end of the latter, form substantially a hollow rectangular casing as best indicated in Figure 3. The upper and lower walls of said casing, as shown in Figure 4, are provided on the interior thereof with transversely extending rear or inner ribs 20—20 and heavier ribs 21—21 located forwardly thereof. Said ribs 20 obviously provide forwardly facing shoulders 22 and the other ribs 21 provide forwardly facing shoulders 23 and also rearwardly facing shoulders 24. The stationary plates E are inserted within the cage in an angular position and then swing to a vertical position in engagement with the ribs 20 and 21 and finally shifted to their proper position. The overall vertical height of the plates E is such that the plates fit loosely between the upper and lower walls 17 of the member A, allowing sufficient play to permit of the same being swung into vertical position without binding on the faces of the walls 17.

Each of said stationary friction plates, as best shown in Figures 3 and 8, is of generally I-cross section with the upper and lower edges thereof thickened as indicated at 25. Said thickened edges are transversely cut away as indicated at 26 so that each of said plates E is formed on the top and bottom edges thereof with rearwardly facing shoulders 122 and 123 and with forwardly facing shoulders 124 to cooperate with the shoulders 22, 23 and 24 respectively of the casting A.

In this manner, each plate E has four points of engagement with the casting A to resist its movement longitudinally inwardly of the casting A and two shoulders to resist its movement outwardly thereof. At the same time however, the plates E are freely responsive to laterally applied pressure as will be understood.

The formation of the plates E, just described, provides channels or guideways on the opposite sides thereof as indicated at 27 in Figure 3 within which guideways are accommodated the longitudinally movable friction plates F, the latter being narrow enough so as to pass between the opposed edges of the ribs 20 and 21. The depth of said guide grooves 27 and the thickness of the plates F are made such that spaces 28—28 are normally left between the opposed edges of the stationary plates E so as to allow the latter to respond freely to lateral pressure and also allow the plates to gradually accommodate themselves as the parts wear. In this connection, it will be observed that the outermost friction plates E, as shown in Figure 3, are flat on their outer sides and hence slightly different from the other stationary plates located inwardly thereof. The stationary and movable plates E and F are intercalated and preferably alternated as shown in the drawings and are divided into two groups, one group on each side of the center line of the mechanism.

Normally, the outer ends of the movable plates F project outwardly beyond the front edge of the casting A and beyond the outer ends of the stationary plates E. The plates F are recessed near their outer or forward edges as indicated at 29 in Figure 7 to receive the cross bar or key L, the cross section of which is made to correspond with the opening 29 and to fit snugly therein. Said openings 29 and the cross key L are disposed centrally of the mechanism considered vertically of the casting A as shown in Figure 2. The stationary plates E are each cut away or recessed on their forward edges as indicated at 30 in line with the cross key L so that the latter is free to move or telescope within the stationary plates E during the compression stroke. Preferably the key L will partially lie within the recesses 30 in normal position of the parts, as shown in Figure 1. This construction I consider of extreme importance for the reason that I am enabled to obtain the desired full movement relatively between the stationary and movable friction plates; at the same time employ as large a frictional wearing area as desired, the net loss in wearing area being that represented by the cut-out portions 30 of the stationary plates E which is small compared to the total area of the plates E; and also maintain normal over-all length from the front edges of the plates F to the rear edges of the plates E, at a minimum. Heretofore, it has always been considered necessary where intercalated friction plates have been employed, to either anchor the movable plates to a follower or other member in such a way that the anchoring means could not possibly enter within the stationary plates, on the one hand, or to make the movable friction plates longer than the stationary friction plates so that the movable friction plates could be pushed alternately from both ends to move them first in one direction and then in the opposite direction, on the other hand. Both of these former methods have obviously required longer movable friction plates than the stationary plates and consequently a longer over-all dimension for the assembled plates per given area of overlapping friction surfaces.

By dividing the intercalated friction plates into two groups, as above described, a central space is left therebetween in which is accommodated the lateral-pressure-creating system. This system includes the wedge H and the two wedge-friction-shoes J—J combined with the anti-friction rollers K therebetween. The wedge H, as best shown in Figures 1 and 5, is provided with an outer flat transversely extending face 31 against which is adapted to bear the inner flat end of a pressure-transmitting lug 32 formed on the inner side of the follower B. Said lug 32 is longitudinally recessed as indicated at 130

3 and the wedge H is also correspondingly recessed in its front face as indicated at 34 to accommodate the cross key L. The total length of the opening formed by the combined recesses 33 and 34 is greater than the longitudinal dimension of the cross key L, as shown in Figure 1, to thereby permit of a limited amount of lost motion between the follower B and the key L without actuating the latter or the movable friction plate F. The wedge H is formed on each side thereof with a roller wedge seat as indicated at 35, said roller wedge seat having a shoulder 36 at its inner end cooperating with the respective roller K to maintain the latter in proper position. The wedge H is also grooved on its upper and lower faces as indicated at 37 to accommodate the retainer bolts M.

Each of the wedge-friction-shoes J, as best shown in Figures 1 and 6, is formed on the outer side thereof with a longitudinally extending flat friction surface 38 engaging with the adjacent inner face of a movable friction plate F. On its inner side, each element J is formed with a roller wedge seat 39 opposite to and parallel with the corresponding roller wedge seat 35 of the wedge H. Upper and lower flanges 40—40 are formed on each member J opposite the corresponding roll seat 39 so as to prevent the rollers K from moving endwise when assembled. At its inner end, each element J is formed with a transversely extending flat bearing surface 41 adapted to engage with a forward extension 42 on the spring follower G.

The spring follower G is sufficiently elongated horizontally so as to provide bearing for both of the springs C on the inner side thereof. On its forward or outer side, the follower G is provided with two of the extensions 42, heretofore referred to, said extensions being laterally separated so as to straddle a heavy cross key or bar 43. Said cross bar 43 normally engages against the inner edges of the central portions of the two upper and lower ribs 21. The ribs 20 are suitably cut away at their central portions to accommodate the bar 43. With this arrangement, the cross bar 43 is limited in its forward movement and is normally held in the position best shown in Figures 1 and 4. Said cross bar forms an anchor for the inner ends of the retainer bolts M, the outer ends of said bolts being anchored in suitable socketed portions of the follower B, as shown. Said retainer bolts straddle the wedge H and pass through suitable openings 44 in the follower lug 32, as shown in Figure 2. With this arrangement the parts may be placed under an initial compression and the parts are retained in assembled relation without danger of loss of any parts.

It is desirable that all the friction elements of a friction shock absorbing mechanism be enclosed or concealed in order to minimize weather effects and also to prevent tampering with the parts. To this end, the follower B is provided with a rearwardly extending flange 45 which telescopes over the forward portion of the casing section of the casting A, said casing section being suitably cut away around all sides thereof as indicated at 46 in Figure 1. The casting A provides shoulders 47 with which engage the inner edges of the flange 45 to limit the compression stroke. On the inner side of the follower B, hardened wear plates 48 may be secured as shown in Figure 1 to engage the outer ends of the movable plates F. Normally there is a space left between the outer ends of the plates F and the follower B, for the purpose hereinafter described.

The operation is as follows, assuming an inward or buffing movement of the drawbar. As the drawbar 13 moves inwardly, it carries therewith the follower B and the member A remains stationary and acts as a follower and load-sustaining member. During the initial inward movement of the follower B, preferably for approximately ½", no actuation of the plates F or the cross key L occurs. However, the wedge H is forced inwardly or rearwardly, thereby setting up the wedging transverse or lateral pressure between it and the shoes J and from the latter to the friction plates. As this initial inward movement of the wedging system occurs, the shoes J are obviously forced rearwardly, this movement being yieldingly resisted by the springs C reacting through the spring follower G. During this initial action of the compression stroke, the desired lateral or spreading pressure on the friction plates is produced and it will be noted that said wedging or lateral pressure is dependent upon the spring pressure and not upon the blow delivered by the drawbar so that the lateral pressure exerted upon the friction plates cannot exceed a certain amount which is always dependent upon the degree of compression of the springs. In this way I positively insure avoidance of any excessive pressure on any of the movable friction elements and am enabled to keep the ultimate or peak load transmitted to the sills, at a comparatively small figure as compared with other types of devices.

After the setting up of the wedging action as above described, the follower B comes into contact with the plates F and thereafter the latter are forced inwardly relatively to the stationary plates E. During this movement of the friction plates F, the frictional resistance will be unusually uniform and, on account of the total area of friction surfaces and the large number of relatively moving friction surfaces, the frictional resistance is very high and the capacity of the mechanism corresponds.

Upon removal of the actuating force, the springs expand and force the spring follower G outwardly. The latter in turn forces the wedge-friction-shoes J outwardly and consequently the wedge H. In this connection it will be observed that no material resistance is afforded to the outward movement of the wedging system during the initial part of the release action for the reason that the wedging system and the follower B are free to move without in any wise shifting the plates F. The above action during the initial portion of the release movement continues until the outer notched ends 49 of the elements J engage the cross key L when the latter will be pushed outwardly and consequently pull the plates F outwardly from their forward ends and thus ultimately all of the parts restored to normal position. Prior to the engagement of the elements J with the key L in the release action, the wedging or spreading pressure will have been reduced substantially to the minimum and consequently the pressure between the intercalated friction plates correspondingly reduced so that very little effort is required in pulling the movable friction plates F outwardly to their normal position.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a column-load-sustaining member; of a plurality of friction elements mounted on said member and anchored against longitudinal movement relatively thereto but responsive to lateral pressure; a plurality of relatively longitudinally movable friction elements intercalated with respect to the first named friction elements; lateral-pressure-creating means cooperable with said intercalated friction elements; a follower movable relatively toward and from said member and adapted to actuate said pressure-creating means and said movable friction elements during a compression movement; a spring resistance; and means engageable with said movable friction elements for retracting the latter during release, said means moving within recesses provided in said relatively stationary friction elements, during a compression stroke.

2. In a friction shock absorbing mechanism, the combination with a column-load-sustaining member; of a plurality of relatively stationary and relatively longitudinally movable intercalated friction elements mounted on said member and all responsive to lateral pressure; means cooperable with said movable friction elements having a path of movement extending to points between the front and rear ends of said stationary friction elements; a spring resistance; lateral-pressure-creating means cooperable with said friction elements, said pressure creating means comprising a member loosely engaging said movable friction elements to move the same in one direction only; a follower for actuating said pressure-creating means and for pushing said movable elements inwardly of the stationary elements; and means interposed between said spring resistance and said first named means arranged to push said first named means outwardly of said stationary friction elements during release to thereby move the movable friction elements outwardly.

3. In a friction shock absorbing mechanism, the combination with a column-load-sustaining member; of a plurality of friction elements mounted on said member and held against movement longitudinally thereof but responsive to lateral pressure; a plurality of relatively longitudinally movable friction elements intercalated with respect to the first named elements, said intercalated elements being divided into two groups with a space therebetween; lateral - pressure - creating means located within said space and cooperable with the two groups of intercalated elements; a follower movable toward and from said member and adapted to actuate said means and to move said movable friction elements during a compression stroke; a spring resistance; and means engageable with said movable elements for retracting the latter during release, said means having a path of movement extending within recesses provided in said stationary friction elements.

4. In a friction shock absorbing mechanism, the combination with a column-load-sustaining member; of a plurality of relatively stationary and relatively longitudinally movable intercalated friction elements mounted on said member and responsive to lateral pressure, said elements being divided into two groups with a space therebetween; means connected to said movable friction elements having a path of movement extending to points between the front and rear ends of the stationary friction elements; a spring resistance; lateral-pressure-creating means disposed within said space and cooperable with the two groups, said pressure creating means including a plurality of members all capable of limited movement relatively to said movable friction elements; a follower arranged to actuate said pressure-creating means and to move the movable elements inwardly during a compression stroke; and means interposed between said spring resistance and said first named means arranged to push the latter outwardly of said member during release to thereby move the movable friction elements outwardly.

5. In a friction shock absorbing mechanism, the combination with a column-load-sustaining member; of a plurality of relatively longitudinally movable friction elements; a plurality of relatively stationary friction elements intercalated with said movable elements, said stationary friction elements being each longitudinally recessed; a member extending transversely of the friction elements having shouldered engagement with said movable friction elements, said member being movable back and forth within said recesses; a spring resistance; a main follower; lateral-pressure-creating means adapted to be actuated by said follower and cooperable with the intercalated friction elements; and means interposed between said spring resistance and said transversely extending member arranged to push the latter outwardly during release to thereby move the movable friction elements in the same direction.

6. In a friction shock absorbing mechanism, the combination with a column-load-sustaining member; of a plurality of relatively longitudinally movable friction elements; a plurality of relatively stationary friction elements intercalated with said movable elements, said stationary friction elements being each longitudinally recessed; a member extending transversely of the friction elements having shouldered engagement with said movable friction elements, said member being movable back and forth within said recesses; a spring resistance; a main follower; lateral-pressure-creating means adapted to be actuated by said follower and cooperable with the intercalated friction elements; and means interposed between said spring resistance and said transversely extending member arranged to push the latter outwardly during release to thereby move the movable friction elements in the same direction, said intercalated friction elements being divided into two groups with a space therebetween and said lateral-pressure-creating means being located within said space.

7. In a friction shock absorbing mechanism, the combination with a follower-acting member having a hollow casing at one end thereof; of a plurality of relatively stationary and relatively longitudinally movable friction elements mounted within casing, said elements being responsive to lateral pressure and the stationary elements being longitudinally recessed; a bar extending transversely of the friction elements having shouldered engagement with the movable friction elements, said bar working back and forth within said recesses; a spring resistance; a main follower; lateral-pressure-creating means actuated by said follower and cooperable with the friction elements; and means interposed between said spring resistance and said bar for projecting the latter outwardly during release.

8. In a friction shock absorbing mechanism, the combination with a follower-acting member having a hollow casing at one end thereof; of a plurality of relatively stationary and relatively longitudinally movable friction elements mounted within said casing, said elements being responsive to lateral pressure and the stationary elements being longitudinally recessed; a bar extending transversely of the friction elements having shouldered engagement with the movable friction elements, said bar working back and forth within said recesses; a spring resistance; a main follower; lateral-pressure-creating means actuated by said follower and cooperable with the friction elements; means interposed between said spring resistance and said bar for projecting the latter outwardly during release; and a flange on said follower telescoped with said casing.

9. In a friction shock absorbing mechanism, the combination with a column-load-sustaining member; of a plurality of relatively longitudinally movable and relatively stationary friction plates mounted on said member, said friction plates being intercalated and the stationary friction plates being longitudinally recessed, the movable friction plates having portions thereof normally extended outwardly beyond the outer ends of the stationary plates; a bar extending transversely of said friction plates near the outer ends of said movable friction plates and having shouldered engagement with the latter; a spring resistance; a main follower; lateral-pressure-creating means cooperable with said intercalated plates and adapted to be actuated by said follower; and means interposed between said spring resistance and said bar for projecting the latter outwardly during release to thereby move said movable friction plates in the same direction.

10. In a friction shock absorbing mechanism, the combination with a column-load-sustaining member; of a plurality of relatively longitudinally movable and relatively stationary friction plates mounted on said member, said friction plates being intercalated and the statonary friction plates being longitudinally recessed, the movable friction plates having portions thereof normally extended outwardly beyond the outer ends of the stationary plates; a bar extending transversely of said friction plates near the outer ends of said movable friction plates and having shouldered engagement with the latter; a spring resistance; a main follower; lateral-pressure-creating means cooperable with said intercalated plates and adapted to be actuated by said follower; and means interposed between said spring resistance and said bar for projecting the latter outwardly during release to thereby move said movable friction plates in the same direction, said follower being normally spaced a slight distance from the outer ends of the movable friction plates and always in direct engagement with said lateral-pressure-creating means.

11. In a friction shock absorbing mechanism, the combination with a casting having a hollow casing at one end, an integral follower at the other end with a spring cage therebetween; of a spring resistance within said cage; a series of relatively longitudinally immovable friction plates disposed within said casing but responsive to lateral pressure; a series of relatively longitudinally movable friction plates alternated with said stationary plates and having their outer ends normally extended outwardly beyond the end of the casing, said stationary plates being longitudinally slotted at their outer ends; a cross bar extending through said movable friction plates and adapted to work within the slots of the stationary plates during a compression stroke; a spring follower interposed between said spring resistance and the friction plates; an outer follower movable toward and from the casing; and lateral-pressure-creating means interposed between said outer follower and the spring follower and cooperable with the alternated friction plates.

12. In a friction shock absorbing mechanism, the combination with a casting having a hollow casing at one end, an integral follower at the other end with a spring cage therebetween; of a spring resistance within said cage; a series of relatively longitudinally immovable friction plates disposed within said casing but responsive to lateral pressure; a series of relatively longitudinally movable friction plates alternated with said stationary plates and having their outer ends normally extended outwardly beyond the end of the casing, said stationary plates being longitudinally slotted at their outer ends; a cross bar extending through said movable friction plates and adapted to work within the slots of the stationary plates during a compression stroke; a spring follower interposed between said spring resistance and the friction plates; an outer follower movable toward and from the casing; and lateral-pressure-creating means interposed between said outer follower and the spring follower and cooperable with the alternated friction plates, said means comprising a plurality of wedge elements and anti-friction means between the elements.

13. In a friction shock absorbing mechanism, the combination with a casting having a hollow casing at one end, an integral follower at the other end with a spring cage therebetween; of a spring resistance within said cage; a series of relatively longitudinally immovable friction plates disposed within said casing but responsive to lateral pressure; a series of relatively longitudinally movable friction plates alternated with said stationary plates and having their outer ends normally extended outwardly beyond the end of the casing, said stationary plates being longitudinally slotted at their outer ends; a cross bar extending through said movable friction plates and adapted to work within the slots of the stationary plates during a compression stroke; a spring follower interposed between the spring resistance and the friction plates; an outer follower movable toward and from the casing; and a lateral pressure creating means interposed between said outer follower and the spring follower and cooperable with the alternated friction plates, said means including a plurality of wedge elements all of which are adapted for a limited amount of movement longitudinally of the mechanism independently of said cross bar.

14. In a friction shock absorbing mechanism, the combination with a casting having a hollow casing at one end, an integral follower at the other end with a spring cage therebetween; of a spring resistance within said cage; a series of relatively longitudinally immovable friction plates disposed within said casing but responsive to lateral pressure; a series of relatively longitudinally movable friction plates alternated with said stationary plates and having their outer ends normally extended outwardly beyond the end of the casing, said stationary plates being longitudinally slotted at their outer ends; a cross bar extending through said movable friction plates and adapted to work within the slots of the stationary plates during a compression stroke; a spring follower interposed between said spring resistance and the friction plates; an outer follower movable toward and from the casing; and lateral-pressure-creating means interposed between said outer follower and the spring follower and cooperable with the alternated friction plates, said means including a plurality of wedge elements, one of which is directly actuated by the outer follower and the remainder directly engaged with the spring follower, said cross bar having a limited amount of movement relatively to all of said elements.

In witness that I claim the foregoing I have hereunto subscribed my name this 6th day of May 1921.

JOHN F. O'CONNOR.

Witnesses:
CARRIE GAILING,
ANN BAKER.